May 15, 1956 G. SITTIG 2,745,312

PROJECTOR FOR SERIES OF PICTURES

Filed Jan. 16, 1952

Inventor:
Georg Sittig
By: Michael S. Striker
agt.

United States Patent Office 2,745,312

Patented May 15, 1956

2,745,312

PROJECTOR FOR SERIES OF PICTURES

Georg Sittig, Berlin-Charlottenburg, Germany, assignor to Pintsch Bamag Aktiengesellschaft, a joint-stock company of Germany Application January 16, 1952, Serial No. 266,659

Claims priority, application Germany January 25, 1951

4 Claims. (Cl. 88—16.6)

The present invention relates to the taking and reproducing of series of pictures, such as motion pictures or pictures for television purposes.

It has previously been suggested taking 24 pictures per second and reproducing each individual picture twice so that 48 pictures per second are reproduced. Each of the individual pictures is projected on to a screen which has to be obturated after the projection of each picture and before the next succeeding picture is projected to enable a change of the picture. Thereby flickering in the reproduction of the pictures is caused. Moreover, the alternating illumination and obturation influence the optic nerves of an observer unfavourably whereby fatigue phenomena may be caused.

It is an object of the invention to prevent or, at least, to decrease these drawbacks.

It is another object of the invention to provide simple means for taking and reproducing series of pictures without any substantial obturation between succeeding pictures.

It is a more specific object of the invention to retain the general brightness of a screen, which prevails during the actual reproduction of an individual picture of a series of pictures projected on to the screen, while the picture changes, whereby the overall brightness may be substantially increased.

Other objects and advantages of the invention will become apparent to those skilled in the art from the following description when read in conjunction with the appended drawings in which.

The present invention is characterized in that two series of pictures displaced relatively to each other are taken or reproduced in such a manner that pictures of the series are taken or reproduced alternately, a picture of one of the series being exposed or illuminated, while the other series of pictures is moved forward from one frame to the next. The pictures of both series may be taken on a single film by subdividing the film into two halves, or on two separate films, one for each series, and may be reproduced from the single film or the two separate films respectively. In any case, it is possible to double the picture frequency on taking and reproducing the pictures without decreasing or substantially decreasing the exposure time for each individual picture. Thus, two series of pictures are obtained which are, however, phase displaced relatively to each other. Each of the two series taken by means of the invention could, alternatively, be reproduced alone, that is to say without the other series by any hitherto known method. When, however, both series are jointly reproduced by means of the invention, the picture frequency remains the same for taking and for reproducing the pictures and obturation between successive pictures is substantially avoided.

By the means of the invention it can be achieved that succeeding phases of movements shown by the pictures merge, for the eyes of an observer, more steadily into one another than with hitherto known means. In order to avoid increasing the length of a film, the size of the pictures may be halved as is known for the purpose of stereoscopic projection, the pictures being rotated through 90° in their planes and laid one beside the next. Alternatively, it is possible to retain the size of the pictures and to double the length of the film. In this case, of course, the distance through which the film has to be moved forward at each film-feeding step has to be doubled. If two separate films are being employed, an alternately operating synchronized film-feed mechanism is used.

Figure 1:
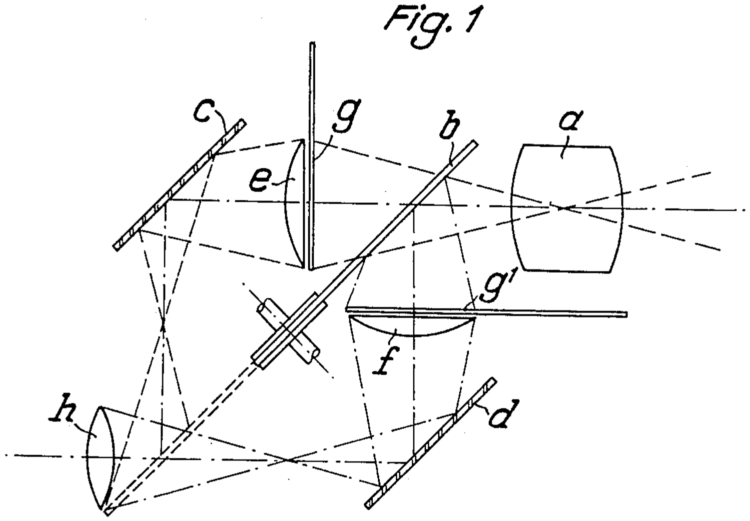
Fig. 1 illustrates diagrammatically an arrangement of the invention.
Figure 2:
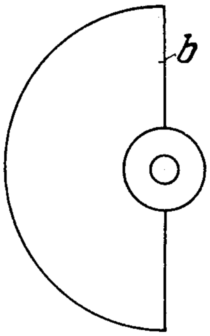
Fig. 2 is a plan view of a detail of Fig. 1.

In the arrangement of Figs. 1 and 2 of the accompanying drawings, when employed for taking two series of pictures, light coming from an object (not shown) passes through a lens system *a* and is caused to impinge alternately on film portions *g* and *g'* by means of a rotating mirror sector *b*, a plan view of which is shown in Fig. 2. The film portions *g* and *g'* may be different portions of a single film or they may be portions of different films. While, for example, the mirror sector *b*, as shown in Fig. 1 in full lines, is located between the lens system *a* and the film portion *g*, light is reflected by the mirror sector *b*, and impinges on a frame of the film portion *g'* which, thus, is exposed to the light. Simultaneously, the mirror sector *b* prevents the light from reaching the film portion *g*, which is, during the same time, moved forward by one frame. When, on further rotation, the mirror sector *b* is located outside the space between the lens system *a* and the film portion *g*, as shown in Fig. 1 in dotted lines, light is not reflected by the mirror sector *b* towards the film portion *g'*, but impinges directly on, and exposes, a frame of the film portion *g*. While the light does not reach the film portion *g'*, the same is moved forward by one frame. The additional mirrors *c* and *d* allow to observe the images on the film portions *g* and *g'* respectively by means of a lens *h*, to facilitate focusing of the arrangement.

On reproduction of the series of pictures, the lens *h* is replaced by a light source, and the mirror sector *b* is reflecting at its front face as well as at its rear face. In the position of the mirror sector *b* shown in Fig. 1 in full lines, light coming from the light source is reflected by the additional mirror *d*, passes through a condenser lens *f*, penetrates a frame of the film portion *g'* is reflected by the reflecting front face of the mirror sector *b* and is projected by the lens system *a* on to a screen (not shown). During the same time the film portion *g* is moved forward by one frame. When the mirror sector *b* has rotated through 180° to assume the position shown in Fig. 1 in dotted lines, light coming from the light source is reflected at the reflecting rear face of the mirror sector *b*, impinges on the additional mirror *c*, is reflected by the said additional mirror *c*, passes through a condenser lens *e*, penetrates a frame of the film portion *g* and is projected by the lens system *a* on to the screen. During this time, the mirror sector *b* prevents light of the light source from reaching the additional mirror *d*; simultaneously, the film portion *g'* is moved forwards by one frame.

Figures 4, 5:
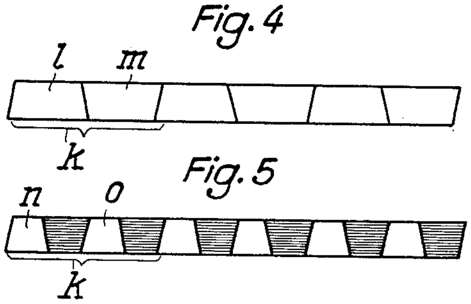
Fig. 4 is a graphical illustration of the brightness of a series of pictures on reproduction by means of the invention and of the division of the pictures on taking the same.
Fig. 5 is a graphical illustration corresponding to that of Fig. 4, but relating to hitherto known methods of reproduction of a series of pictures.

It will easily be understood that no substantial alteration of the overall brightness occurs owing to the fact that the impinging light rays cross each other in front of the additional mirrors *c* and *d*, and the mirror sector *b* on its rotation, enters one of the two possible paths of the light rays to the same extent as it recedes from the other. Thereby, the dark intervals which hitherto occurred and which are illustrated in Fig. 5 are avoided; instead, a substantially uniformly illuminated series of pictures is obtainable in Fig. 4. The braces *k* of Figs. 4 and 5 include two picture intervals in Fig. 4 and one picture interval in Fig. 5, so that during the same time interval in Fig. 4 two phase-displaced pictures *m* and *l* appear, while with hitherto usual arrangements as indicated in Fig. 5 two equal pictures appear which, however, are separated from each other and the succeeding picture by two dark intervals.

Figure 3:
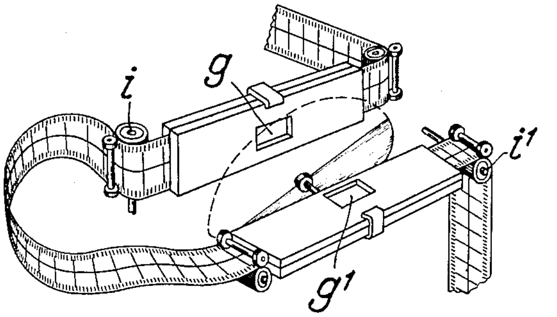
Fig. 3 shows a perspective view of an arrangement of the invention, in which a single film is employed for carrying two series of pictures.

In the arrangement of Fig. 3, rollers *i* and *i'* serve as feed rollers, *g* and *g'* indicate frames of two different portions of the same film, the two portions being arranged at opposite sides of the centre line of the film. If two separate films are used, the feed rollers for the films have to be arranged at corresponding ends of the film gates so that both films are fed in the same direction.

Various arrangements of the two series of pictures on a single film or on two films are possible depending primarily on the size of the film or films used for taking and reproducing the pictures. For example, if a film of 16 mm. with or less is used, it is recommended not to halve the film along its centre line as shown in Fig. 3, but rather to double the length of the film whereby the hitherto usual size of the pictures can be retained and, in the case of a talking film, the sound reproduction may be improved. When the hitherto normal film size is used, the film may be halved as shown in Fig. 3 and the size of each picture correspondingly halved without exceeding practical limits for sufficiently enlarging the pictures on reproducing them. For projecting stereoscopic pictures, it is recommended to take the pictures on two separate films each of normal size, since in this case each film may separately be used for reproducing non-stereoscopic pictures. In any case, by means of the invention an improved reproduction of the pictures and, in the case of talking films, also an improved reproduction of the sound can be obtained.

Moreover, in the case of non-stereoscopic pictures, it is possible to obtain two negatives without parallactic displacement of the basis for taking the pictures, and to utilize copies of the negatives either for reproducing them in the hitherto usual manner or for reproducing them by the means of the present invention. Thereby, the introduction of this invention into general use is facilitated.

In the case of stereoscopic reproduction requiring filters for separating the pictures, the introduction of this invention into use is facilitated by the fact that the increase of the general brightness of the film counteracts the light absorbing effect of the filters, which may absorb up to 50% of the light intensity. In this case, no commercial objections should prevent the introduction of this invention into use.

Furthermore, the present invention may be employed in connection with stereoscopic television.

It should be clearly understood that the drawings are given by way of example only and that many modifications, additions and omissions are possible without departing from the spirit of the invention.

I claim:

1. In a projector, in combination, a rotatably mounted sector-shaped shutter blade having opposite reflecting faces, said sector-shaped shutter blade sweeping a circular plane during rotation and said blade being located entirely on one side of its axis of rotation; means for directing a light beam along a first path intersecting said circular plane at a first point of intersection so that said light beam is reflected along a second path by that face of said shutter which faces said light beam during passage of said shutter through said first point of intersection, rotation of said shutter thus resulting in alternating projection of said light beam along said first and second paths; a pair of reflecting means respectively arranged in said paths to reflect light beams projected along said first and second paths respectively along third and fourth paths intersecting each other in said circular plane at a second point of intersection on the opposite side of said axis from said first point and spaced from the axis of rotation of said shutter by the same distance as said first point of intersection, so that during rotation of said shutter through said second point of intersection the other reflecting face of said shutter reflects the light beam reflected along said third path into said fourth path; and optical projecting means arranged in said fourth path on the side of said second point of intersection opposite from the reflecting means located in said second path, so that a film portion located in said second or fourth path between said circular plane and the reflecting means in said second path will be projecting through said projecting means alternately with a film portion located in said first or third path between said circular plane and the reflector means located in said first path.

2. A projector comprising, in combination, light directing means for directing a beam of light along a straight line; an objective spaced from said straight line and having an optical axis parallel thereto; a shutter having a pair of opposite overlying reflecting side faces and being turnably mounted for movement between a first position intersecting said line and a second position intersecting said optical axis, said shutter being located entirely on one side of its axis of rotation and having its center of rotation located centrally between said line and said optical axis; first film supporting means for supporting a first film portion in a plane normal to said optical axis and on the opposite side of said shutter from said objective when said shutter intersects said optical axis; second film supporting means for supporting a film portion in a plane parallel to said optical axis and on the same side of said shutter as said objective when said shutter intersects said optical axis; first reflector means located on the side of said first film supporting means opposite from said objective for reflecting a light from said shutter along said optical axis when said shutter intersects said line; and second reflector means located on the side of said second film supporting means opposite from said optical axis and intersecting said line to reflect the beam of light through said second film supporting means to said shutter when the latter intersects said optical axis.

3. A projector comprising, in combination, light directing means for directing a beam of light along a straight line; an objective spaced from said straight line and having an optical axis parallel thereto; a shutter having a pair of opposite overlying reflecting side faces and being turnably mounted for movement between a first position intersecting said line and a second position intersecting said optical axis, said shutter being located in a plane making a 45° angle with said line and optical axis and said shutter extending through substantially 180° and having its center of rotation located centrally between said line and optical axis; first film supporting means for supporting a first film portion in a plane normal to said optical axis and on the opposite side of said shutter from said objective when said shutter intersects said optical axis; second film supporting means for supporting a film portion in a plane parallel to said optical axis and on the same side of said shutter as said objective when said shutter intersects said optical axis; first reflector means located on the side of said first film supporting means opposite from said objective for reflecting a light from said shutter along said optical axis when said shutter intersects said line; and second reflector means located on the side of said second film supporting means opposite from said optical axis and intersecting said line to reflect the beam of light through said second film supporting means to said shutter when the latter intersects said optical axis.

4. A projector comprising, in combination, a rotatably mounted semi-circular shutter blade having opposite coextensive reflecting faces, said shutter blade sweeping a circular plane during rotation; means for directing a light beam along a first portion of a first path, said first portion intersecting said circular plane at a first point of intersection so that said light beam is reflected along a first portion of a second path by that face of said shutter blade which is directed toward said light beam during movement of said shutter through said first point of intersection so that said light beam is alternately projected along said first portions of said first and second paths; a pair of reflecting means respectively arranged in said first portions of said paths to reflect light beams projected along said first portions respectively along second portions of said paths intersecting each other in said circular plane at a second plane of intersection spaced from the axis of rotation of said shutter by the same distance as said first point of intersection, so that during rotation of said shutter through said second point of intersection the other reflecting face of said shutter reflects the light beam reflected along the second portion of said first path into the second portion of said second path; optical projecting means arranged in said second portion of said second path on the side of said second point of intersection opposite from the reflecting means located in said second path; and a pair of film supporting means respectively located in said first and second paths between said circular plane and said pair of reflecting means, whereby film portions carried by said pair of film supporting means, respectively will be alternately projected through said optical projecting means during rotation of said shutter.

References Cited in the file of this patent

UNITED STATES PATENTS

| | | |
|---|---|---|
| 540,545 | Gray | June 4, 1895 |
| 711,440 | Reichenbach | Oct. 14, 1902 |
| 963,125 | Dyer et al. | July 5, 1910 |
| 1,308,207 | Tolles et al. | July 1, 1919 |
| 1,313,587 | Douglass | Aug. 19, 1919 |
| 1,320,860 | Hunt | Nov. 4, 1919 |
| 1,585,129 | Smith | May 18, 1926 |
| 2,052,960 | Berggren | Sept. 1, 1936 |
| 2,056,600 | Crosier | Oct. 6, 1936 |

FOREIGN PATENTS

| | | |
|---|---|---|
| 14,754 | Great Britain | Of 1902 |
| 698,239 | France | Jan. 28, 1931 |
| 514,624 | Great Britain | Nov. 14, 1939 |
| 923,567 | France | July 10, 1947 |
| 54,872 | France (1st addtion to No. 923,567) | Dec. 7, 1950 |
| 977,674 | France | Apr. 4, 1951 |
| 893,269 | Germany | Oct. 15, 1953 |